United States Patent
Liu et al.

(10) Patent No.: US 8,266,265 B2
(45) Date of Patent: Sep. 11, 2012

(54) DATA TRANSMISSION OVER A NETWORK WITH CHANNEL BONDING

(75) Inventors: Changwen Liu, San Diego, CA (US); Ronald B. Lee, San Diego, CA (US); Glenn Delucio, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 617 days.

(21) Appl. No.: 12/241,629

(22) Filed: Sep. 30, 2008

(65) Prior Publication Data
US 2010/0082791 A1    Apr. 1, 2010

(51) Int. Cl.
*G06F 15/173* (2006.01)
(52) U.S. Cl. ...... 709/223; 709/224; 709/226; 455/426.2
(58) Field of Classification Search .......... 370/336, 370/337, 347, 389, 509, 392; 455/426.2; 709/217
See application file for complete search history.

(56) References Cited

U.S. PATENT DOCUMENTS

| | | | |
|---|---|---|---|
| 5,594,738 A * | 1/1997 | Crisler et al. | 370/347 |
| 7,792,955 B2 * | 9/2010 | Myojo et al. | 709/224 |
| 7,940,800 B2 * | 5/2011 | Feinberg | 370/473 |
| 2002/0093928 A1 * | 7/2002 | LoGalbo et al. | 370/336 |
| 2003/0224784 A1 * | 12/2003 | Hunt et al. | 455/426.2 |
| 2004/0258030 A1 * | 12/2004 | Johnson | 370/337 |
| 2005/0232304 A1 | 10/2005 | Quigley | |
| 2006/0176861 A1 | 8/2006 | Schmidt | |
| 2007/0053321 A1 | 3/2007 | Beales | |
| 2007/0133588 A1 | 6/2007 | Kwon et al. | |
| 2008/0037541 A1 * | 2/2008 | Souissi et al. | 370/392 |
| 2008/0120667 A1 | 5/2008 | Zaltsman | |

* cited by examiner

*Primary Examiner* — Robert Wilson
*Assistant Examiner* — Mohamed Kamara
(74) *Attorney, Agent, or Firm* — Bruce W. Greenhaus (57) ABSTRACT

A system that transmits data over multiple networks receives data packets at a client node and forms a plurality of data aggregates from the data packets. The system then sends a request for a duplicate transmission to a coordinator node on a first network. In response to the request, the system receives a first transmission slot on the first network and a second transmission slot on a second network for transmission of the data aggregates. The system then splits the data aggregates among the first transmission slot and the second transmission slot and transmits the data aggregates on the first transmission slot and the second transmission slot.

32 Claims, 7 Drawing Sheets

DATA TRANSMISSION OVER A NETWORK WITH CHANNEL BONDING

FIELD

This disclosure is directed generally to a communication network, and in particular to data packet transmission in a communication network.

BACKGROUND INFORMATION

In some networking environments, communication networks may be formed when multiple interoperable nodes communicating over a shared medium detect the existence of other nodes. One example of such a network is a network that operates in accordance with the Multimedia over Coax Alliance ("MoCA") MAC/PHY Specification. In this network, nodes may function as "clients". It should be noted that client nodes are sometimes referred to as "slave nodes". In addition to client nodes, such networks also include at least one "Network Coordinator node" (NC). It should be noted that NCs are sometimes referred to as either "master nodes" or "network controller nodes". A network will typically have a single NC and any number of client nodes. The NC may transmit beacons and Media Access Plans ("MAPs") as well as other control information to manage the network.

Figure 1:
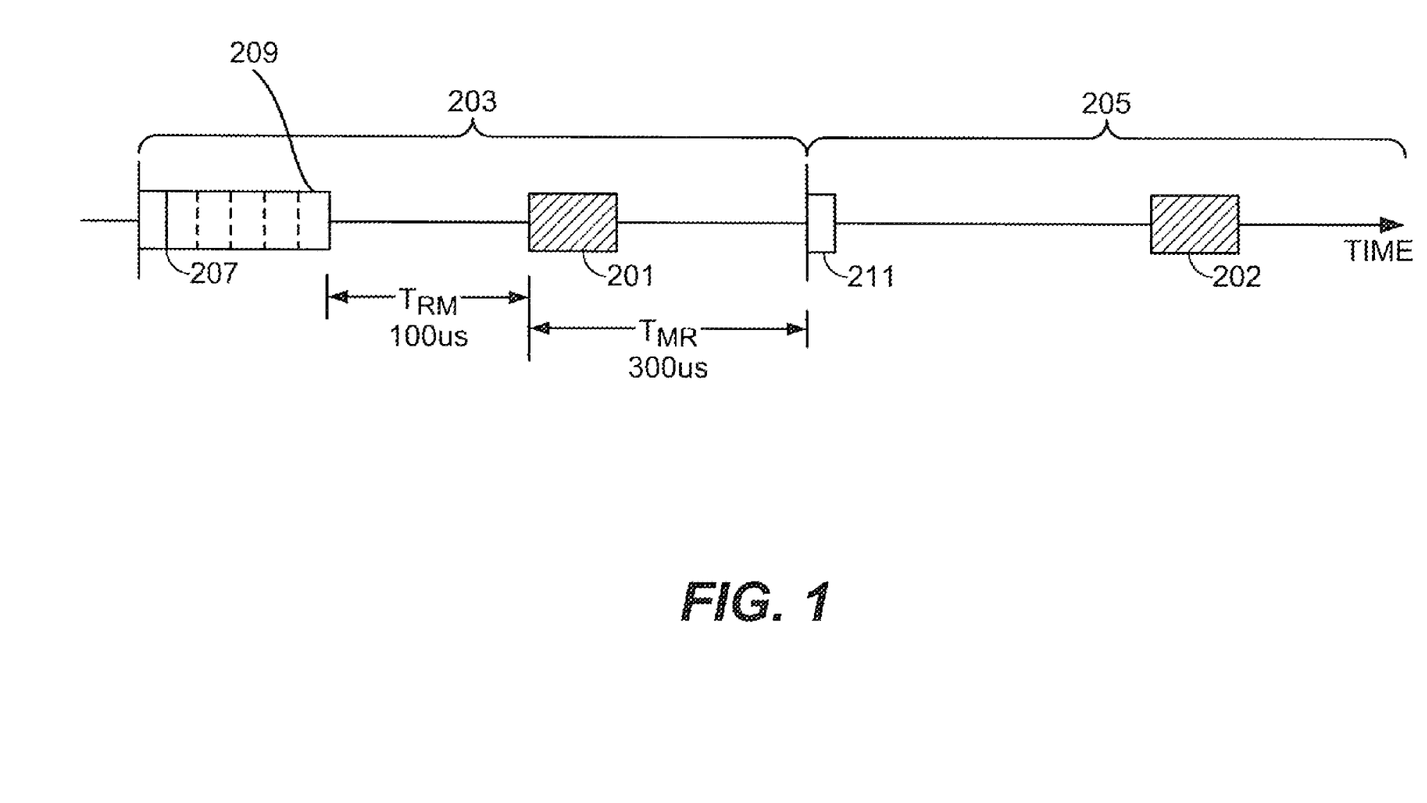
FIG. 1 is a timing diagram that illustrates the timing relationship between MAPs and MAP cycles.

To establish a system to allocate network bandwidth, the NC schedules times during which communication occurs over the network. The NC communicates the schedule to each client node in MAPs. Each MAP is a packet of information. One MAP is sent by the NC during each "MAP cycle". FIG. 1 is a timing diagram that illustrates the timing relationship between MAPs 201, 202 and MAP cycles 203, 205. The MAP cycle 205 is defined as the communication activity on the channel under the control of the previously sent MAP 201. Accordingly, the MAPs 201 schedule all of the communication activity for the next MAP cycle 205 (only one such "next MAP cycle" 205 is shown in FIG. 1). It should be noted that the next MAP 202 is sent during the next MAP cycle 205 under the scheduling control of the previous MAP 201. Accordingly, MAPs 201, 202 determine the following information for each packet to be sent in the next MAP cycle 205: i) packet start time; ii) packet length; iii) source node; and iv) destination node(s). The combination of a packet start time, the packet length for the packet to be sent at that start time, and the source node and destination node for that packet are referred to herein as a "transmission slot assignment".

One particular type of packet that the MAP 201, 202 is responsible for scheduling is a reservation request (RR) 207, 209, 211. Six such RRs are shown in the first MAP cycle 203 of FIG. 1, starting with the first RR 207 and ending with the last RR 209. One RR 211 is shown in the second MAP cycle 205. RRs 207, 209, 211 are sent by client nodes to indicate that the client node has packets that it wishes to send and thus to request that the NC schedule a time during a subsequent MAP cycle when the client node can send those packets. Accordingly, when a client node has information to transmit, the client node must first wait for the NC to allocate a time when the client node can send an RR 207, 209, 211. Once the NC has allocated a time during which the client node can sent an RR 207, 209, 211, the client node communicates the RR 207, 209, 211 to the NC at the time allocated (i.e., at the packet start time and for the packet length indicated by the MAP 201, 202). In some systems (not shown), an Orthogonal Frequency Division Multiple Access (OFDMA) scheme can be used. In such an OFDMA scheme, each of the RRs is modulated on a separate subcarrier and transmitted in the same transmission slot.

The RR 207, 209, 211 allows the client node to communicate to the NC that the client node has data packets it wishes to send. Furthermore, the RR 207, 209, 211 indicates the associated destination node(s), packet length, packet priority and so on for those data packets. The NC uses this information to schedule additional times during which the client node can transmit those additional data packets it wishes to send. The NC then communicates that schedule by generating and transmitting the MAP 201 having transmission slot assignments for the next MAP cycle 205.

Networks, such as MoCA networks and Ethernet-based networks, have an increasing need for more bandwidth. However, such networks are typically formed from physical channels that have a finite amount of bandwidth. For example, each physical channel in a MoCA network has a bandwidth of approximately 100 MHz. One method of increasing bandwidth for Ethernet networks is through channel bonding or link aggregation in which multiple Ethernet network cables and/or ports are combined in parallel to increase the throughput beyond the limits of any one single cable or port and to increase the redundancy and thus provide higher availability (i.e., reliability). However, known methods of channel bonding encounter difficulties in load-balancing the traffic among the multiple channels so that the data is evenly distributed.

SUMMARY

In one embodiment of the disclosed method and apparatus, a client node receives data packets. The client node combines received data packets together (or "aggregates" the data) to form a plurality of "data aggregates". The client node then sends a reservation request ("RR") in which the client node requests the Network Coordinator (NC) to schedule a time during which the client node can transmit to another client node in the network. In response to the request, the client node receives a first transmission slot assignment which indicates which time slot (i.e., "transmission slot") within a MAP cycle on the first network to transmit a first portion of the data and second transmission slot assignment indicating which transmission slot within a MAP cycle on a second network to transmit a second portion the data. The system then splits the data among the first assigned transmission slot of the first network and the second assigned transmission slot of the second network and transmits the data at those transmission slots on the first network and the second network.

DETAILED DESCRIPTION

In one embodiment of the disclosed method and apparatus, a network transmits data packets using channel bonding by splitting packets among two channels on two different networks.

Figure 2:
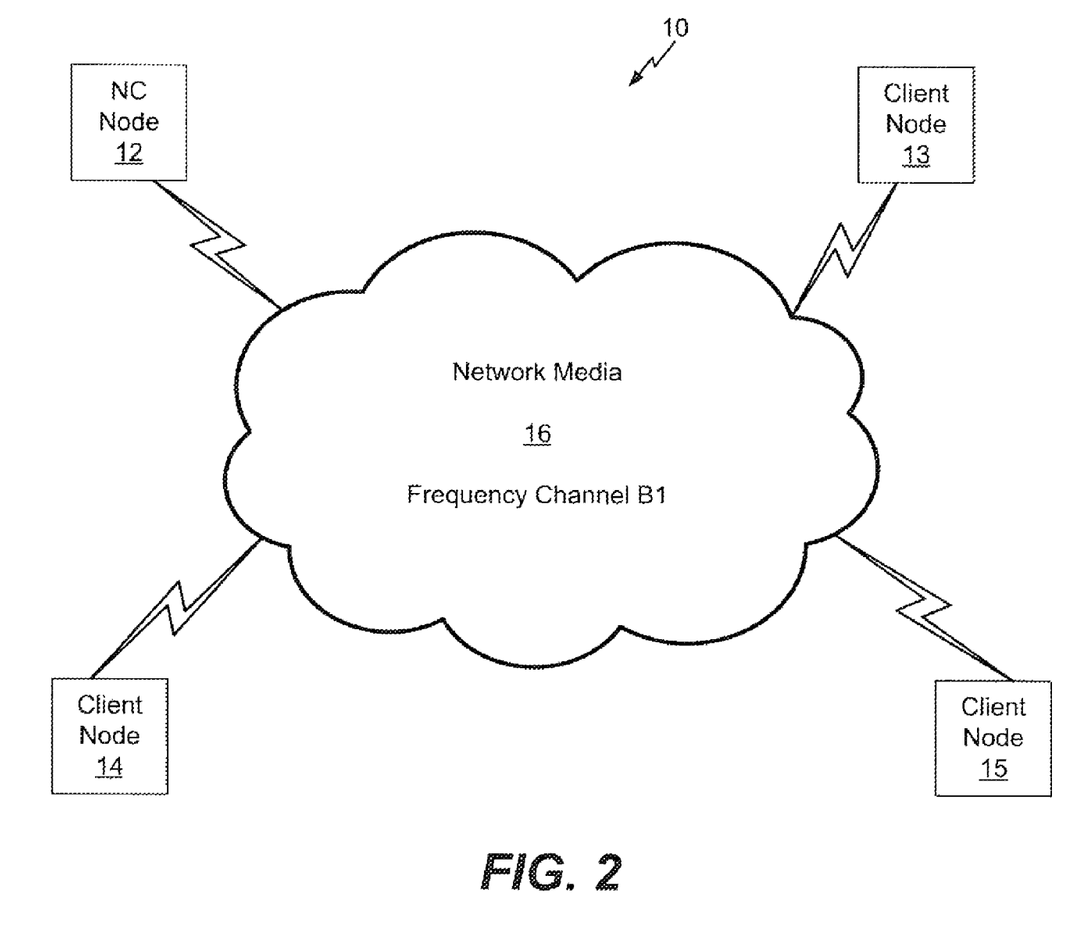
FIG. 2 is a block diagram of a network in accordance with one embodiment of the disclosed method and apparatus.

FIG. 2 is a block diagram of a network 10 in accordance with one embodiment of the disclosed method and apparatus. The network 10 includes an Network Coordinator (NC) 12 and client nodes 13-15. In one embodiment of the disclosed method and apparatus, the network 10 is a home network. Each of the nodes 12-15 (including both the NC and all of the client nodes) is integrated with, is included within, or is coupled to, an entertainment device in the home. Each such entertainment device is capable of communicating data to form messages to the other entertainment devices. Examples of such entertainment devices include, but are not limited to, set-top boxes, digital video recorders ("DVR"s), computers, televisions, routers, etc. The nodes 12-15 are coupled to a network media 16 over which the data is transferred. In one embodiment of the disclosed method and apparatus, the network media 16 is coaxial cable. However, the network media 16 may be any other type of media or facility, including other wired media or wireless media, that enables the devices to communicate with one another. In one embodiment of the disclosed method and apparatus, the network 10 is a full mesh network so that any node on the network can communicate directly with any of the other nodes on the network in any direction.

In one embodiment of the disclosed method and apparatus, the network 10 operates as a network within the allowable frequencies established by the industry standard, Multimedia over Coax Alliance MAC/PHY Specification v. 1.0 (hereinafter, "MoCA 1.0"). The range of frequencies in MoCA 1.0 is 875-1500 MHz. The channels exists at frequency intervals of either 25 MHz or 50 MHz. Therefore, there is a channel having a center frequency at 875 MHz, another at 900 MHz, another at 925 MHz, and so on through 1000 MHz. The frequencies then skip to 1150 MHz with channels at 50 MHz intervals from there up to 1500 MHz. The channels are centered at 1150 MHz, 1200 MHz, etc., up to 1500 MHz. In the example of FIG. 2, the network 10 operates at channel 900 MHz (referred to in the MoCA specification as channel B1). A second network having an NC and multiple client nodes operates at a different frequency.

In one particular example, the second network operates at 1200 MHz (referred to in the MoCA specification as Channel channel D2). However, any two available channels may be used. The nodes 12-15 can concurrently be part of two or more networks. All of the networks will transmit data over the same bus or backbone, but each network transmits at a different frequency. In one embodiment of the disclosed method and apparatus, one node 12 will function as the NC in at least two of the networks. It is possible for that node to be the only node that is common to the different networks. In one embodiment of the disclosed method and apparatus, there is at least one node that is not common to both the first and second network. In one embodiment of the disclosed method and apparatus, each node that is common to more than one network has a separate network integrated circuit chip/processor for each network to which the node is a member (i.e., can transmit data).

Figure 3:
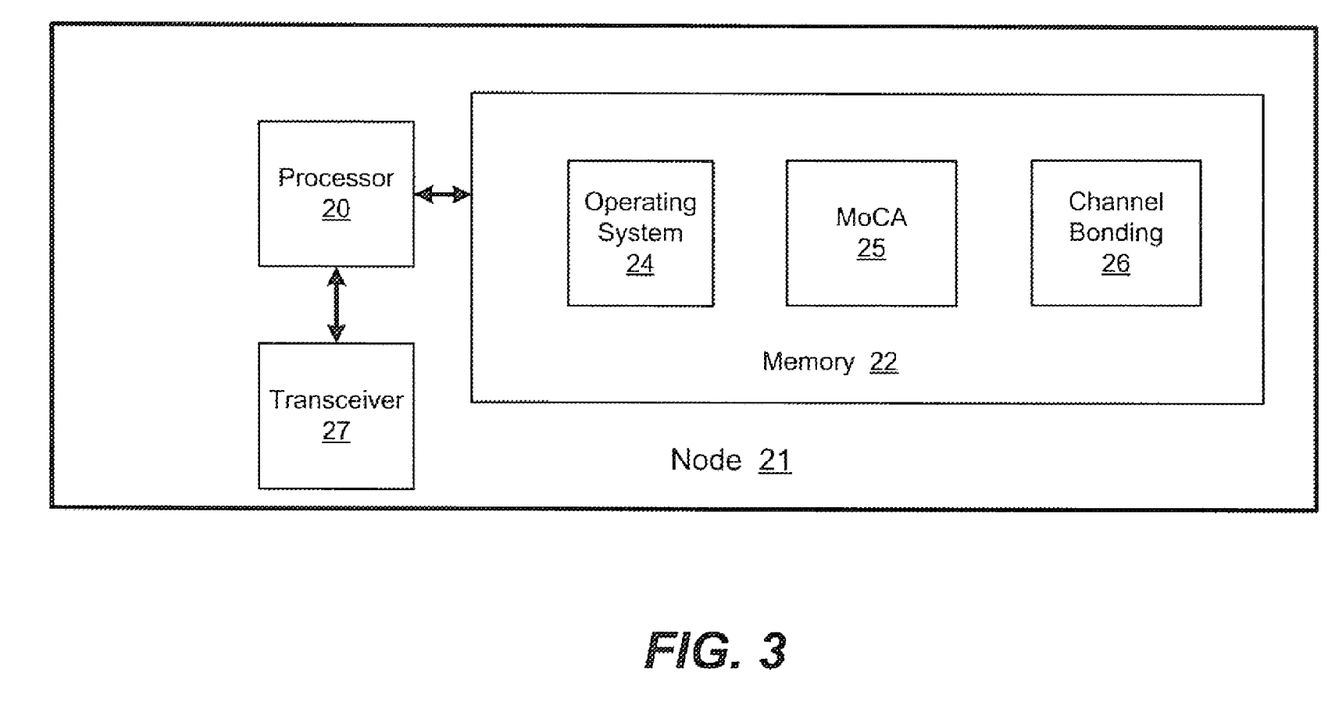
FIG. 3 is a block diagram of a node in accordance with one embodiment of the disclosed method and apparatus.

FIG. 3 is a block diagram of a node 21 in accordance with one embodiment of the disclosed method and apparatus. The Node 21 can function as an NC, such as the node 12 of FIG. 2, or as a client node, such as the nodes 13-15 of FIG. 2. The node 21 includes a processor 20, a transceiver 27, and a memory 22. The processor 20 may be any type of general or specific purpose processor. The transceiver 27 can be any device that transmits and receives data. The memory 22 stores instructions to be executed by the processor 20 and information. The memory 22 can include of any combination of random access memory ("RAM"), read only memory ("ROM"), static storage such as a magnetic or optical disk, or any other type of computer readable medium.

Computer readable medium may be any available media that can be accessed by the processor 20 and includes both volatile and nonvolatile media, removable and non-removable media, and communication media. Communication media may include computer readable instructions, data structures, program modules or other data in a modulated data signal such as a carrier wave, or other transport mechanism, and includes any information delivery media.

In one embodiment of the disclosed method and apparatus, the memory 22 stores software modules that provide functionality when executed by the processor 20. The modules include an operating system 24, a MoCA module 25 and a channel bonding module 26. The functionality of these modules, although shown as software in FIG. 3, can be implemented by any combination of hardware or software in other embodiments.

In one embodiment of the disclosed method and apparatus, the operating system 24 provides the functionality that allows the processor 20 to operate the node 21, including controlling the transceiver 27 and the memory 22, and the MoCA module 25 provides the functionality to allow the node 21 to operate in accordance with one or more MoCA standards. In one embodiment of the disclosed method and apparatus, the channel bonding module 26 performs channel bonding by distributing and transmitting packets over two or more channels, as disclosed in more detail below.

In one embodiment of the disclosed method and apparatus, the node 21 can transmit or receive data over multiple channels/networks by including multiple receivers/transmitters at a single location. A single physical processor, such as the processor 20, may be divided to function simultaneously on more than two channels, or may be comprised of two or more processors with one functioning as the master and the other(s) function as a slave. Each processor handles packet processing at its channel and the master processor performs the final assembly. In another embodiment, the node 21 may include a separate physical processor for each channel on which the node is operating. Each channel, as disclosed above, forms a separate network that includes an NC and transmits and receives over a unique frequency.

As noted above, nodes are assigned one or more transmission slots of predetermined length in a framing structure commonly referred to as a MAP cycle that contains multiple transmission slots. All nodes are synchronized by MAPs that are broadcast by the network NC. MAPs are messages sent by the NC to define when each node will be allowed to transmit, such as described in the MoCA 1.0 industry standard.

In one embodiment of the disclosed method and apparatus, the node 21 acts as the NC and schedules data transmissions over two channels through channel bonding. The node 21 determines how to divide the data equally over two or more channels, when applicable.

Figure 4A:
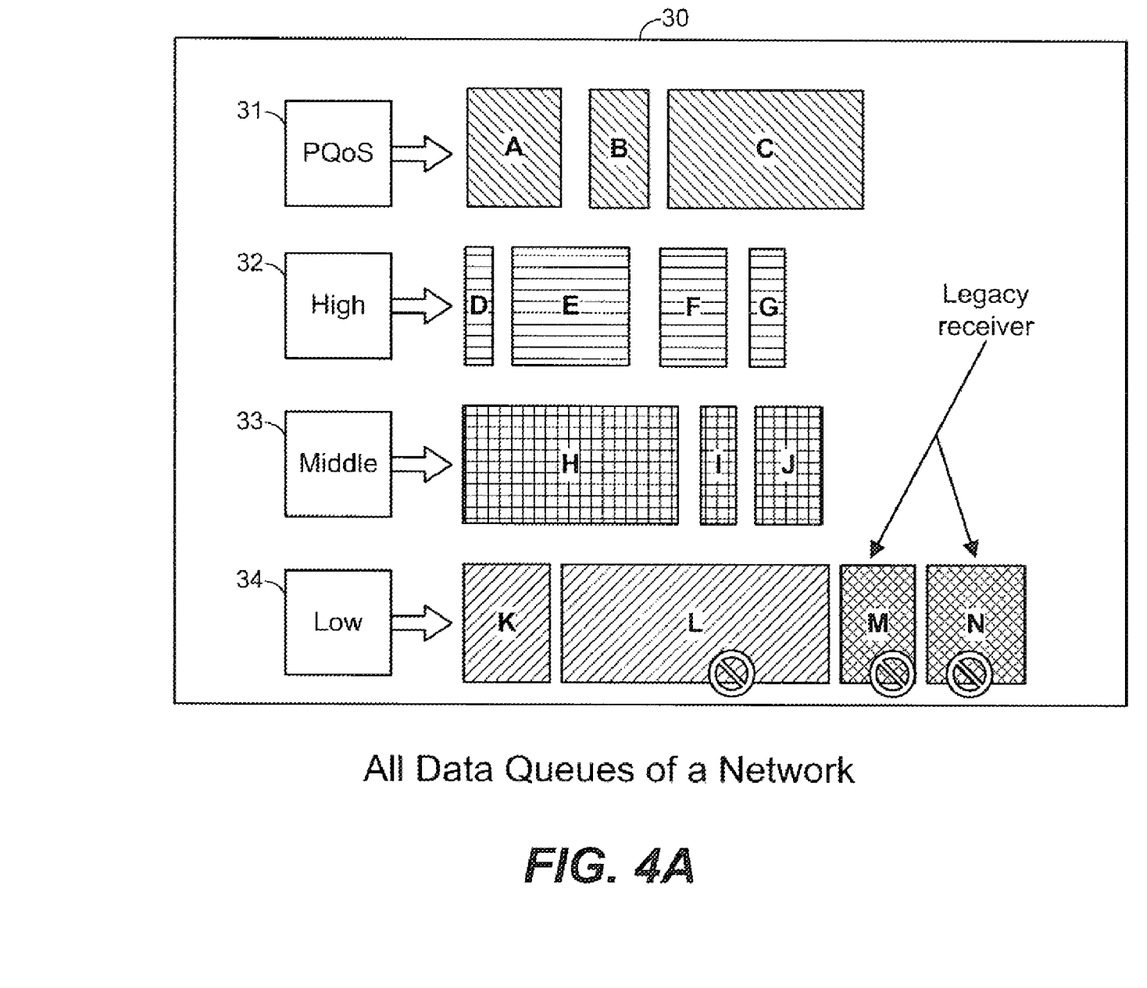
FIG. 4A is a diagram showing a queue of data to be transmitted from the node.

FIG. 4A is a diagram of the data transmission request (DTR) queue 30 in the NC 12. Data Transmission Requests (DTRs) A-N received from all of the nodes by the NC 12 are loaded into the DTR queue 30. Up to 17 DTRs can be transmitted to the NC 12 within one Reservation Request (RR) from a client node 21 in accordance with one embodiment of the disclosed method and apparatus that operates in accordance with the MoCA 1.0 industry standard. RRs are scheduled in a MAP Cycle, as will be discussed in more detail below.

The DTR queue 30 is divided into multiple sub-queues. One such sub-queue is a guaranteed quality of service ("QoS") queue 31 for critical data such as voice packets. DTRs A-C loaded in the QOS queue 31 receive the highest priority. Another sub-queue is a high priority queue 32. DTRs D-G get the second highest priority. Yet others are a middle priority queue 33 and a low priority queue 34. DTRs H-J get the third highest priority and DTRs K-N get the lowest priority.

Each DTR A-N is associated with data to be transmitted from a transmitting node to a receiving node. In one embodiment, the data packets are aggregated to be transmitted from the transmitting node to the receiving node. A collection of data packets that are aggregated together are referred to herein as a "data aggregate" for simplicity. For the purpose of describing the function of the disclosed method and apparatus, FIG. 4A depicts each DTR A-N as having different relative lengths, the lengths being indicative of the amount of time required to transmit the associated data. However, it should be understood that the contents of the subqueues 31-34 is just the DTR which indicates the amount of data. Accordingly, each DTR in the queue is approximately the same length, even though they are shown with lengths relative to the length of the associated data. In one embodiment, the amount of data is indicated in terms of the amount of time required to transmit the data. However, in another embodiment, the amount of data is indicated in terms of either the number of symbols to be transmitted, the number of bits of data, or any other quantity that indicates the actual amount of information to be transmitted. In one embodiment, the amount of data includes any overhead data as well as the payload data. However, in an alternative embodiment, the amount of data includes only the payload. In yet another embodiment, the amount of data includes the payload and some portion of the overhead.

The low priority queue 34 includes DTRs M, N for transmission of legacy packets (or "non-channel bonding packets"). Non-channel bonding packets are either sourced from, or destined to, a node that does not support channel bonding (e.g., a MoCA 1.0 node that cannot communicate across two channels). The legacy data packets associated with the DTRs M and N may be single packets or aggregates of multiple packets. Each DTR is associated with data and identifies the node that is to received the data. In one embodiment, all packets in each aggregate associated with one DTR A-N in queue 30 are destined for the same receiving node.

Figure 4B:
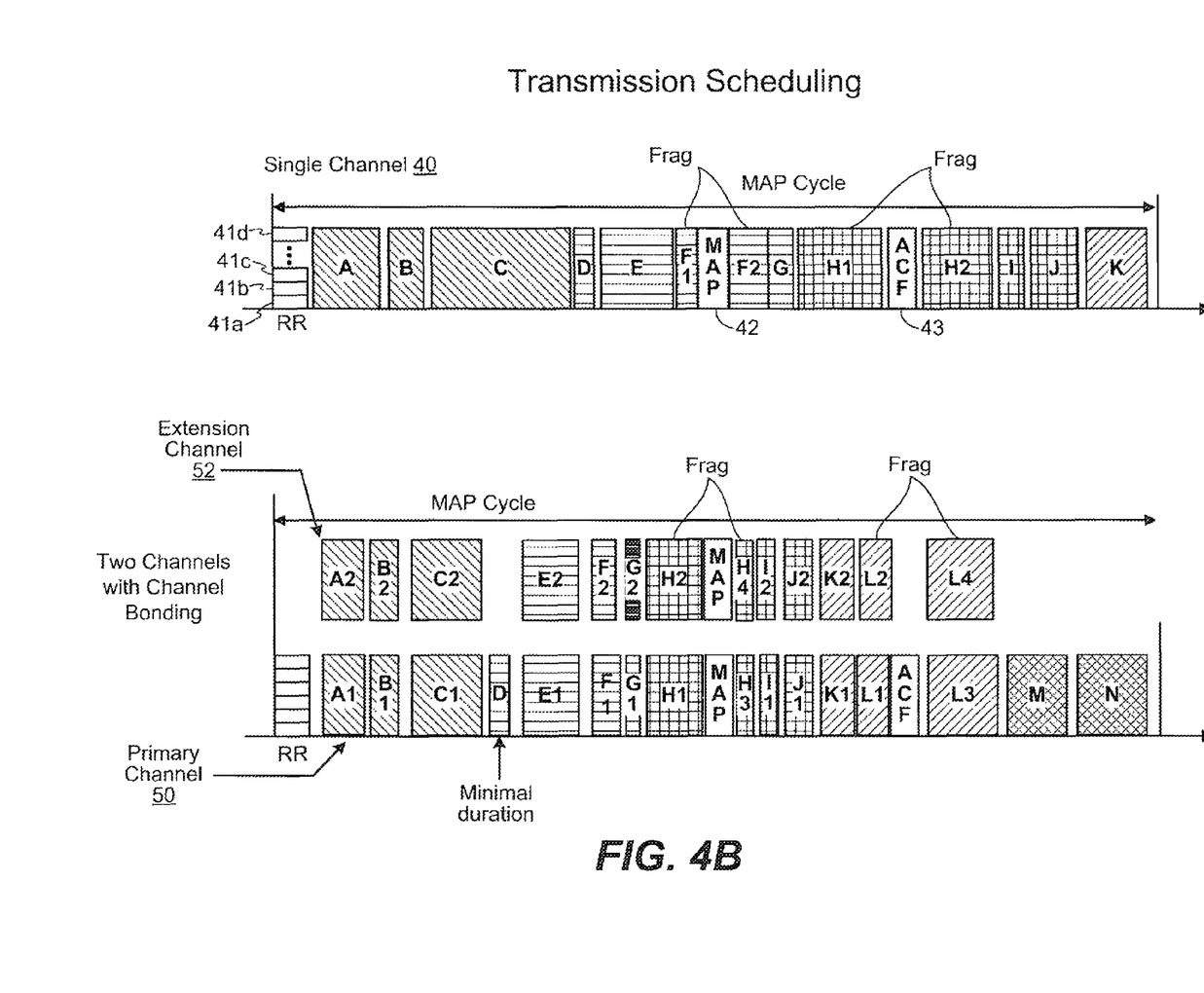
FIG. 4B is a diagram showing transmission slot assignments within a MAP in accordance with one embodiment of the disclosed method and apparatus.

FIG. 4B shows one example of the transmission slots assigned for each transmission request within one MAP Cycle. In networks without channel bonding, all data packets for which a DTR has been received and loaded in queue 30 would be assigned and scheduled to be transmitted on a single channel 40, as shown in FIG. 4B. In one embodiment, each transmitting node sends a DTR for each of the data aggregates that the transmitting node has to transmit. Alternatively, a DTR can be associated with a single packet of data. The NC 12 receives the DTRs and loads them into the appropriate subqueue 31-34. The DTRs are loaded into the subqueues 31-34 in accordance with information indicating the priority of the data associated with the DTRs. The priority information is provided directly in the DTR. In response to loading the DTRs into the subqueues 31-34, the NC 12 schedules transmission of as much of the data as possible during a single scheduling period or "MAP Cycle".

In a single channel network, as shown with channel 40, a MAP Cycle includes a transmission slot for each of the following: (1) a set of reservation requests ("RRs") 41, each of which is sent on one of 224 OFDMA subcarriers 41a-41d; (2) aggregates, in consecutive order, starting from the aggregate associated with the DTRs A, B, C in highest priority queue 31 and working through to the DTRs K, L, M, N in lowest priority queue 34; (3) a MAP header 42 and (4) an admission control frame ("ACF") 43.

In accordance with the MoCA 1.0 standard, the MAP Cycle is of a predetermined length, and the MAP header 42 and ACF 43 must occur at particular times within the MAP Cycle. Accordingly, as shown in FIG. 4B, the aggregates associated with the DTRs F and H are split into two fragments, with one of the two fragments associated with DTR F being sent before transmission of the MAP header 42 and the other fragment associated with DTR F being sent after the MAP header 42. Likewise, the data associated with DTR H is split into two fragments, one fragment transmitted before and one after the transmission of the ACF 43.

Because each MAP cycle has a limited duration, the lowest priority aggregates associated with the DTRs L, M, N in queue 34 cannot fit within the MAP Cycle shown in the single channel 40. Therefore, these requests will remain and the aggregates associated with them will have to be transmitted in a subsequent MAP Cycle.

In contrast to scheduling shown in single channel 40, embodiments of the disclosed method and apparatus perform channel bonding for at least two channels in one or more of the following arrangements: (1) one transmitter node makes use of two channels to deliver data to one receiver node; (2) two transmitter nodes make use of two channels to deliver data to one receiver node; and (3) one transmitter node makes use of two channels to deliver data to two receiver nodes. The two "bonded" channels can be designated as a "primary" channel 50 and an "extension" channel 52. However, either of the two channels 50, 52 may be considered the primary channel. Furthermore, it will be understood by those skilled in the art that while most of the discussion provided herein regards the use of two bonded channels, it is possible in accordance with the disclosed method and apparatus to have more then two bonded channels.

The disclosed method and apparatus for channel bonding requires minimal or no changes to the physical layer of each channel. Instead, changes are made to the Media Access Control ("MAC") layer. In all embodiments of the disclosed method and apparatus, there is at least one transmitter node, at least one receiver node, and an NC. The NC may be the transmitter node, the receiver node, or a node which is neither the transmitter nor receiver node. However, the NC must be a member of all of the networks with which a channel is to be "bonded".

In one embodiment of the disclosed method and apparatus, a client node 21 splits its queued data that require more than a predefined minimum transmission slot into two portions. Each portion is transmitted on a different one of two channels, a primary channel 50 and an extension channel 52. The data associated with each DTR is divided such that each portion requires an equal transmission time across the respective one of the two channels over which it is to be transmitted. In this embodiment, a single transmitter makes use of the two channels simultaneously to transmit data to one receiver. Each channel 50, 52 is on a different network. Each network has its own NC. The node 21 transmits over both networks. The two NCs are physically located at the same node.

The node 21 generates a DTR requesting a transmission slot on both channels. The DTR requests a transmission slot on the primary channel 50 having a duration that is sufficient to transmit that portion of the data to be transmitted over the primary channel. Since the data is divided into portions that will take the same amount of time to transmit over each channel, the amount of time required to transmit over the primary channel 50 will be the same as the amount of time required to transmit over the extension channel 52.

A bit is set to indication that the data will be split over two channels transmitting simultaneously. In response, the primary channel NC schedules the primary channel, and duplicates the schedule in the extension channel for two equal durations in the two channels, starting at the approximately same time and ending at approximately the same time.

Link control packets also start at approximately the same time and end at approximately the same time. The NC duplicates its schedule in both the primary and the extension channels for data and control packets/aggregates, excluding legacy packets such as packets associated with the DTRs M, N in queue 34, packets that require a transmission slot of less than a minimum duration, such as the packet associated with DTR D in queue 32, and ACF 43 transmission slot. Accordingly, the NC 12 sends two nearly identical MAPs for the two channels. However, the following are only sent on primary channel 50: (1) RRs 41; (2) legacy aggregates M, N; (3) packets D that require less than a minimum transmission slot; and (4) ACF slots 43.

As shown in FIG. 4B, data associated with a DTR that requires more than a minimum transmission slot is split evenly into two portions requiring equal transmission time. The two portions are transmitted concurrently across primary channel 50 and extension channel 52. The two portions are then received in the same transmission slot by the receiving node, where they can be instantly combined to retrieve the original aggregate. Therefore, minimal buffering is required at the receiving nodes.

In another embodiment, instead of the transmitting node evenly splitting the data, the NC performs the task of splitting the data. In this embodiment, the client node sends the DTR with a request to send the entire aggregate over the primary channel instead of requesting only the amount of time required to transmit an evenly split portion. The NC then calculates how to split the data for each DTR, and specifies the transmission slots allocated to the DTR in the two MAPs (i.e., the MAP for the primary channel and the MAP for the extension channel). The MAP in the primary channel specifies the assigned transmission slots in the primary channel and the MAP in the extension channel specifies the assigned transmission slots in the extension channel. When a transmission is split across the two channels, the two assigned transmission slots start at approximately the same time and end at approximately the same time, Link control packet transmissions in the two channels also start at approximately the same time and end at approximately the same time. The MAP for the primary channel 50 can then be almost the same as that for extension channel 52, except for the transmissions of legacy aggregates, minimum duration packets, and ACF slots, as shown in FIG. 4B.

Figure 5:
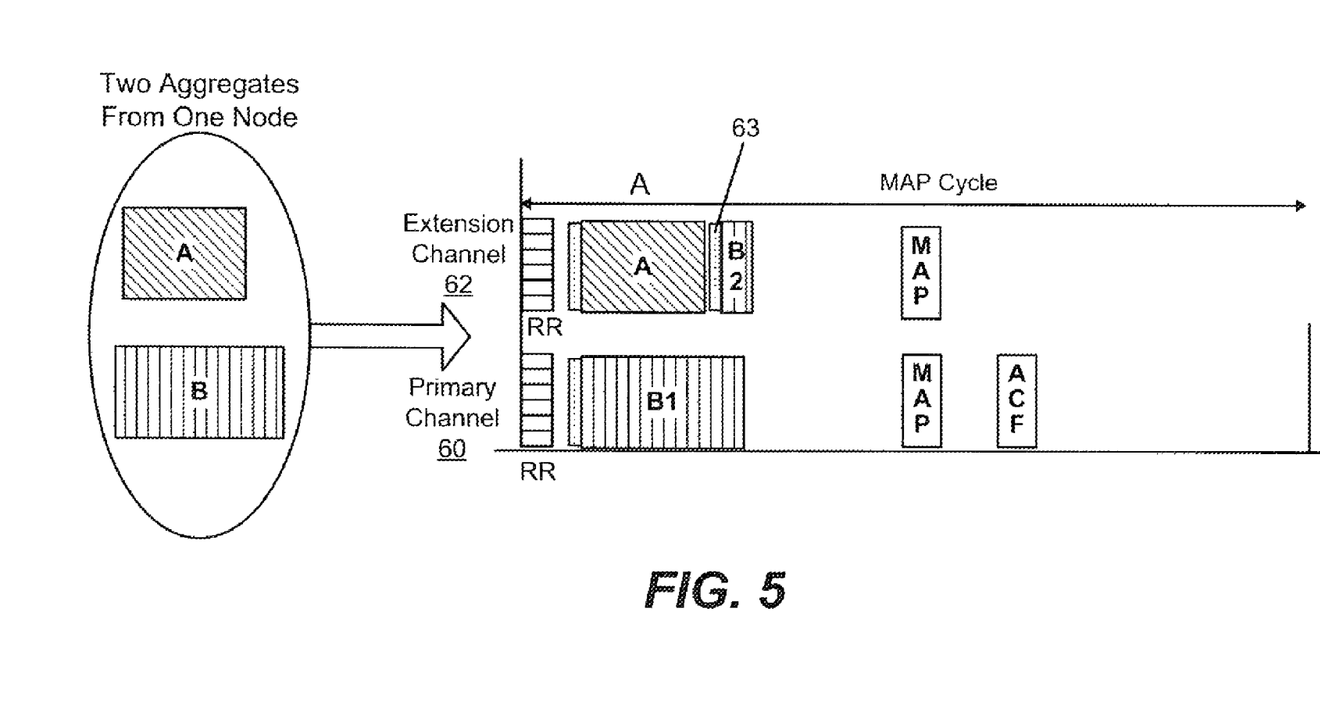
FIG. 5 illustrates channel bonding with coordinated splitting in accordance with one embodiment of the disclosed method and apparatus.

FIG. 5 illustrates channel bonding with coordinated splitting in accordance with one embodiment of the disclosed method and apparatus. In this embodiment, instead of splitting each individual DTR evenly and independently as shown in FIG. 4B, the NC 12 coordinates the splitting of one DTR into another DTR. In this embodiment, each DTR, either for a single packet or for an aggregate of packets, can be split across two channels, evenly or not, if the amount of time required to transmit one of the packets is longer than a minimal duration. Client nodes send their reservation requests containing DTRs for transmissions entirely over the primary channel. As shown in FIG. 5, DTRs associated with aggregates A and B are sent from the same source node and intended for the same destination node. The NC 12 splits the longer aggregate B into two aggregates B1 and B2. B1 is scheduled on a primary channel 60 and B2 is scheduled on an extension channel 62. The NC 12 also schedules the transmission of aggregate A on the extension channel 62 so that the transmission duration of aggregate B1 is equal to the sum of the durations of aggregate B2 and aggregate A, including the Inter-Frame Gap ("IFG") 63 between aggregate B2 and aggregate A. Therefore, the NC splits the longer duration request B so that: Duration of B1=Duration of A+IFG+Duration of B2 and schedules their transmission accordingly.

In another embodiment, a single transmitter makes use of two channels simultaneously to transmit data to two different receivers. As with the coordinated splitting disclosed in FIG. 5, the NC 12 coordinates the transmission of aggregates A and B from the same source, but to two different destinations. Further, the NC 12 coordinates the transmission power so that the transmitting node transmits the aggregates using maximum power.

In another embodiment, two transmitters can make use of two channels to simultaneously transmit data to one receiver. As with the single transmitter to single receiver embodiments, the data may be transmitted using channel bonding by splitting the data evenly as disclosed in FIG. 4, or by coordinated splitting as disclosed in FIG. 5. For the example of FIG. 5, the aggregates A and B must be intended for the same destination, but can be from either the same or different sources. Further, in this embodiment the NC 12 coordinates the transmission power from each transmitting node so that the receiving power is approximately equal.

Figure 6:
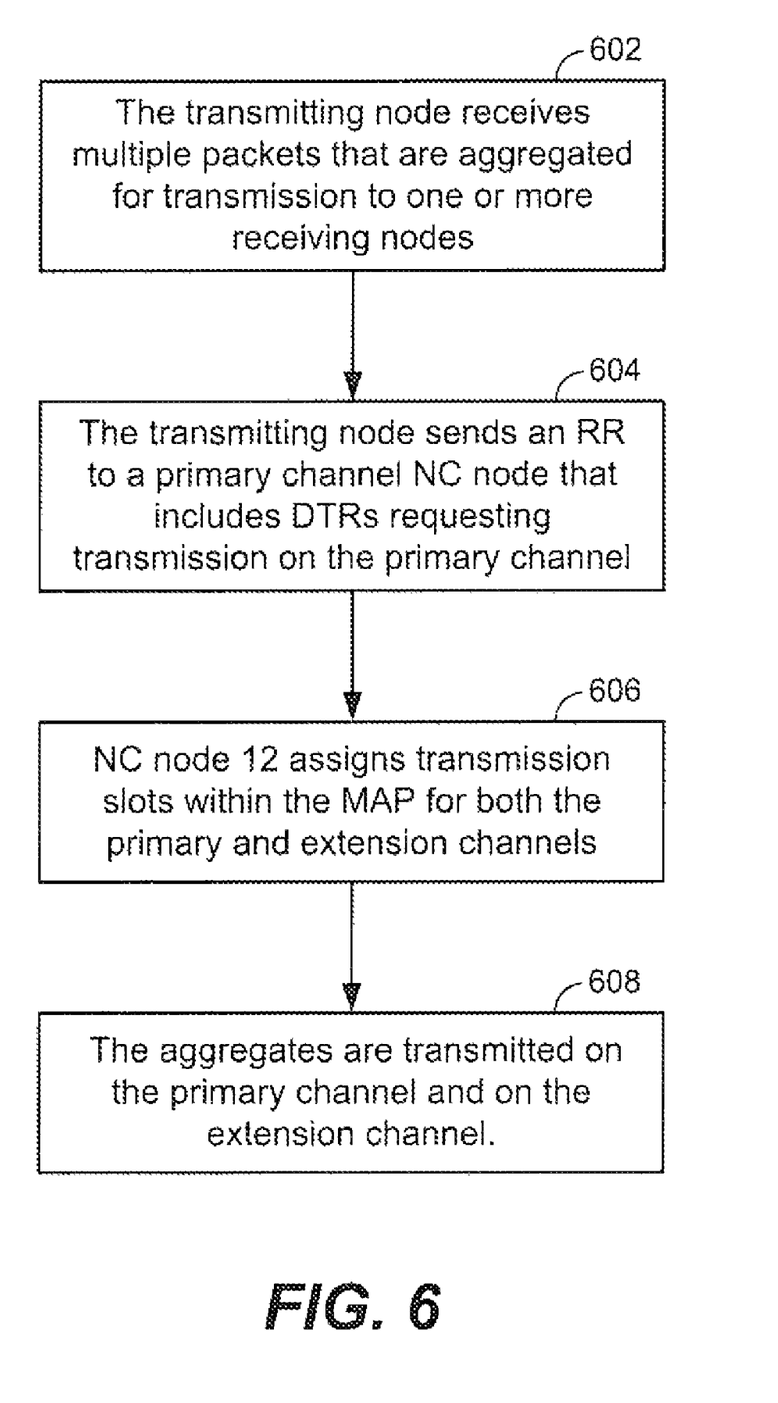
FIG. 6 is a flow diagram of the functionality of the node of FIG. 3 in accordance with one embodiment of the disclosed method and apparatus when transmitting packets on multiple channels.

FIG. 6 is a flow diagram of the functionality of the node 21 of FIG. 3 in accordance with one embodiment of the disclosed method and apparatus when transmitting packets on multiple channels. In one embodiment of the disclosed method and apparatus, the functions shown in FIG. 6 are implemented by software. The software is stored in a computer readable medium and executed by a processor. In other embodiments, the functions are performed by hardware. Such hardware may include one or more application specific integrated circuits ("ASICs"), programmable gate arrays ("PGAs"), field programmable gate arrays ("FPGAs"), etc. In yet another embodiment the functions are performed by a combination of hardware and software.

At 602, a transmitting client node identifies multiple packets to be transmitted to one or more receiving client nodes within the same network. Such packets are typically received by the transmitting client node from other devices that are either coupled to the transmitting client node or that the transmitting client node resides within. Such other devices include digital video recorders, televisions, computers, set-top boxes, media servers, etc. In one embodiment, the packets are aggregated to form aggregates by priority and destination.

At 604, the transmitting node sends an RR to a primary channel NC 12. The RR includes one DTR associated with each of the aggregates. Each DTR indicates the amount of time required to transmit the aggregate on the primary channel.

In response, at 606 the NC 12 assigns transmission slots within the MAP for both the primary and extension channels to as many aggregates as will fit within the next MAP cycle.

In one embodiment, the transmission slot assignments are made to ensure that the aggregates are evenly split between the two channels. Alternatively, as noted above, the transmission slot assignments are made to make the most efficient use of the bandwidth controlled by the MAP. Each DTR indicates whether the associated aggregate is to be split between the primary and extension channels, and thus whether the transmission slot assignments in the two channels are to be identical. In one embodiment of the disclosed method and apparatus, the client node does the splitting prior to sending a RR. In another embodiment, the NC determines how to split the aggregates between the channels.

At 608, the aggregates are transmitted on the primary channel and on the extension channel. Transmissions on the primary channel and extension channel start at approximately the same time and end at approximately the same time.

Several embodiments are specifically illustrated and/or described herein. However, it will be appreciated that modifications and variations of the disclosed embodiments are covered by the above teachings and within the purview of the appended claims without departing from the spirit and intended scope of the invention.

I claim:

1. A method of transmitting data comprising:
   a) sending from a first node that is a member of both a first and a second network, a data transmission request;
   b) receiving at the first node a first transmission slot assignment on the first network and a second transmission slot assignment on the second network;
   d) splitting data to be transmitted into a first and second portion the first portion comprising a first and second aggregate of packets and the second portion comprising a third aggregate of packets; and
   e) transmitting from the first node, the first portion during the first assigned transmission slot and transmitting from the first node, the second portion during the second assigned transmission slot wherein the amount of time required to transmit the first aggregate of packets is approximately equal to the amount of time required to transmit the second aggregate of packets plus an interframe gap plus the third aggregate of packets.

2. The method of claim 1, wherein the first and second assigned transmission slots start at approximately the same time and end at approximately the same time.

3. The method of claim 1, wherein the data transmission request is sent to a network coordinator, the network coordinator being responsible for assigning transmission slots on the first and second network.

4. The method of claim 3, wherein the network coordinator is further responsible for determining how data is to be divided between assigned transmission slots.

5. The method of claim 1, wherein:
   a) the first network includes a first set of nodes that can each communicate with one another;
   b) the second network includes a second set of nodes that can each communicate with one another; and
   c) there exists at least one node that is not common to both the first and second set of nodes.

6. The method of claim 1, wherein the splitting comprises dividing the data approximately evenly between the networks.

7. The method of claim 1, wherein the splitting is performed by the first node.

8. The method of claim 1, wherein the splitting is performed by a first coordinator node.

9. The method of claim 1, wherein the first transmission slot assignment is an assignment to transmit over a primary channel.

10. The method of claim 9, wherein the first coordinator node on the first network uses the request made for a transmission slot on the primary channel as a request for an additional transmission slot on an extension channel.

11. The method of claim 1, wherein the first network conforms to a Multimedia over Coax Alliance (MoCA) industry standard.

12. The method of claim 1, wherein the data transmission request is a reservation request element in accordance with the MoCA industry standard.

13. The method of claim 1, wherein the data in the first portion is a first aggregate of packets formed based on a priority and a destination and the second portion includes a second aggregate of packets, wherein the packets of the second aggregate have the same priority and destination as the packets of the first aggregate and wherein the second portion further includes a third aggregate of packets, at least one of the priority or destination of the packets of the third aggregate being different from priority or destination of the packets of the first and second aggregates.

14. A method for assigning a transmission slot to a client node comprising:
   a) receiving a first data transmission request from a client node; and
   b) sending at least a first transmission slot assignment on a first network and a second transmission slot assignment on a second network to the client node;
   c) receiving from a client node at least a second data transmission request associated with second data;
   wherein data associated with the first data transmission request is split between the first and second assigned transmission slot such that a first portion of the data is to be sent during the first transmission slot and a second portion of the data is to be sent during the second transmission slot;
   wherein the first and second assigned transmission slots start at approximately the same time and end at approximately the same time; and
   wherein the amount of time required by the client node to send the first portion of data is equal to the amount of time required to transmit the second portion of data plus an interframe gap plus the amount of time required to transmit the data associated with the second data transmission request.

15. A client node, the client node being a member of at least two networks, the client node comprising:
   a) a memory;
   b) a processor coupled to the memory, the processor configured to read instructions from the memory to perform the following functions;
   i) send a data transmission request;
   ii) receive at least a first transmission slot assignment on a first of the at least two networks and a second transmission slot assignment on a second of the at least two networks; and
   iii) split data to be transmitted into at least a first and second portion, the first portion comprising a first aggregate of packets and a second aggregate of packets and the second portion having a third aggregate of packets, packets of the first and second aggregates having the same priority and destination; and
   c) a transmitter coupled to the processor and receiving the first and second portion from the processor, the transmitter transmitting the first aggregate of packets during the first assigned transmission slot and transmitting the second aggregate of packets, an interframe gap and the third aggregate of packets during the second assigned transmission slot;

wherein the amount of time required to transmit the first aggregate of packets is approximately equal to the amount of time required to transmit the second aggregate of packets plus the inter-frame gap plus the amount of time required to transmit the third aggregate of packets.

16. The client node of claim 15, wherein the process performs the further functions of:
   a) receiving at least a third transmission slot assignment on a third of the at least two networks;
   b) splitting the data to be transmitted into at least a third portion, and
   wherein the transmitter receives the third portion and transmits the third portion during the third assigned transmission slot.

17. The client node of claim 15, wherein the transmitter transmits the first and second portion under the control of the processor.

18. A network controller, the network controller being a member of a first network and a second network, the network controller comprising:
   a) a memory;
   b) a transceiver;
   b) a processor coupled to the memory and to the transceiver, the processor receiving information received by the transceiver and transmitting information provided to the transceiver, the processor also reading instructions from the memory to perform the following functions;
   i) receive a first data transmission request associated with first data to be transmitted from, and residing at, a client node that is a member of the networks, the first data transmission request indicating the amount of first data to be transmitted from the client node, the first data comprising a first aggregate of packets and a second aggregate of packets;
   ii) receive a second data transmission request associated with a second data to be transmitted from, and residing at, a client node that is a member of the networks, the second data transmission request indicating the amount of second data to be transmitted from the client node, the second data comprising a third aggregate of packets;
   iii) generating a first transmission slot assignment by assigning the first aggregate of packets during a first transmission slot on the first network;
   iv) generating a second transmission slot assignment by assigning the second aggregate of packets and the third aggregate of packets to be transmitted during a second transmission slot on the second network;
   iv) communicating to the transceiver the first and second transmission slot assignments; and
   v) causing the transceiver to transmit the first transmission slot assignment on the first network and the second transmission slot assignment on the second network, wherein the time required to transmit the first aggregate of packets in the first transmission slot assignment is equal to the amount of time required to transmit the second aggregate of packets, plus an inter-frame gap plus the third aggregate of packets.

19. The network controller of claim 18, wherein the function of generating the first and second transmission slot assignments further includes ensuring that the first and second transmission slots start at approximately the same time and end at approximately the same time.

20. A non-transitory computer readable media having instructions stored thereon that, when executed by a processor, causes the processor to transmit digital data by:
   a) sending a reservation request to a first network coordinator (NC) on a first network;
   b) receiving a first transmission slot assignment on the first network and a second transmission slot assignment on a second network;
   c) splitting data among the first assigned transmission slot and the second assigned transmission slot the data associated with the first assigned transmission slot comprising a first and second aggregate of packets and the data associated with the second assigned transmission slot comprising a third aggregate of packets; and
   d) transmitting the data on the first assigned transmission slot and the second assigned transmission slot such that the amount of time required to transmit the first aggregate of packets on the first assigned transmission slot is equal to the amount of time required to transmit the second aggregate of packets plus an interframe gap plus the third aggregate of packets.

21. The computer readable media of claim 20, wherein the splitting is performed by the client node.

22. The computer readable media of claim 20, wherein the splitting is performed by the first NC.

23. The computer readable media of claim 20, wherein the first transmission slot is provided on a primary channel.

24. The computer readable media of claim 23, wherein the first NC on the first network uses the request for a transmission slot on the primary channel to generate a request in an extension channel.

25. The computer readable media of claim 20, wherein the first network is based on a Multimedia over Coax Alliance industry standard.

26. The computer readable media of claim 25, wherein the request is a reservation request.

27. The computer readable media of claim 20, wherein the first transmission slot and the second transmission slot start and end at approximately the same instant in time.

28. The computer readable media of claim 20, wherein the data aggregates are formed based on a priority and a destination associated with each packet.

29. A system for transmitting digital data comprising:
   a) means for receiving a plurality of data packets at a client node and forming a plurality of data aggregates from the data packets;
   b) means for sending a request for a duplicate transmission to a first coordinator node on a first network;
   c) in response to the request, means for receiving a first transmission slot on the first network and a second transmission slot on a second network for transmission of the data aggregates;
   d) means for splitting the data aggregates among the first transmission slot and the second transmission slot; and
   e) means for transmitting the data aggregates on the first transmission slot and the second transmission slot such that the amount of time required to transmit the data aggregates on the first transmission slot is equal to the amount of time required to transmit the data aggregates on the second transmission slot plus the amount of time required for at least one interframe gap between each of the aggregates.

30. A network node in a first network comprising a first network controller node and at least one first client node and in a second network comprising a second network controller node and at least one second client node, the network node comprising:

a) a transceiver that receives a plurality of data packets; and
b) a channel bonding module coupled to the transceiver that forms a plurality of data aggregates from the data packets and sends a request for a duplicate transmission to the first network controller node;

wherein the channel bonding module, in response to the request, receives a first transmission slot on the first network and a second transmission slot on the second network for transmission of the data aggregates and splits the data aggregates among the first transmission slot and the second transmission slot; and wherein the transceiver transmits the data aggregates on the first transmission slot and the second transmission slot such that the amount of time required to transmit the data aggregates on the first transmission slot is equal to the amount of time required to transmit the data aggregates on the second transmission slot plus the amount of time required for at least one interframe gap between each of the aggregates.

31. The network node of claim 30, further comprising a first processor coupled to the transceiver and comprising a master processor and a slave processor.

32. The network node of claim 30, further comprising a first processor coupled to the transceiver and a second processor coupled to the transceiver.

* * * * *